(12) United States Patent
Ziavras

(10) Patent No.: US 6,481,302 B2
(45) Date of Patent: *Nov. 19, 2002

(54) SLIP RING POSITION ENCODER

(75) Inventor: John Ziavras, Hermosa Beach, CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,822

(22) Filed: Aug. 12, 1999

(65) Prior Publication Data

US 2002/0014127 A1 Feb. 7, 2002

(51) Int. Cl.⁷ ................................................. G08C 9/06
(52) U.S. Cl. ..................................................... 73/865.8
(58) Field of Search ............................ 73/865.8, 865.9, 73/866.5; 324/691, 693, 699, 701, 166, 168, 207.25; 235/103

(56) References Cited

U.S. PATENT DOCUMENTS 2,666,912 A * 1/1954 Gow et al.
2,972,740 A * 2/1961 Lahti
3,815,126 A * 6/1974 Batz

* cited by examiner

Primary Examiner—Robert Raevis
(74) Attorney, Agent, or Firm—Gates & Cooper LLP

(57) ABSTRACT

A method, apparatus, and an article of manufacture for determining the angular position of a shaft. The apparatus comprises a circumferentially alternating series of conducting and substantially non-conducting segments on an exterior surface of the shaft, and at least one contact surface in communication with the surface of the shaft, the contact surface sized to communicate with no more than one conducting segment at a time. Another embodiment of the present invention is described by a method of determining the angular position of a shaft by sensing a conductivity of an exterior surface of the shaft having an alternating series of conducting and substantially non-conductive surfaces, and determining the shaft angular position using the sensed conductivity of the exterior surface of the shaft. In one embodiment of the invention, the foregoing conductivity is used to supply datum information, and the precise angular position of the shaft is determined from the datum and from a number of stepper motor step commands supplied to rotate the shaft in operation. The present invention can also be used in an embodiment in which the angular position of the shaft is determined solely from the number of stepper motor commands provided to rotate the shaft. In this embodiment, sensed conductivity is periodically used to confirm the angular position determined from stepper motor commands. This provides information regarding the shaft position with greater reliability, less cost, lower weight, and within a smaller physical envelope than previous designs.

19 Claims, 15 Drawing Sheets

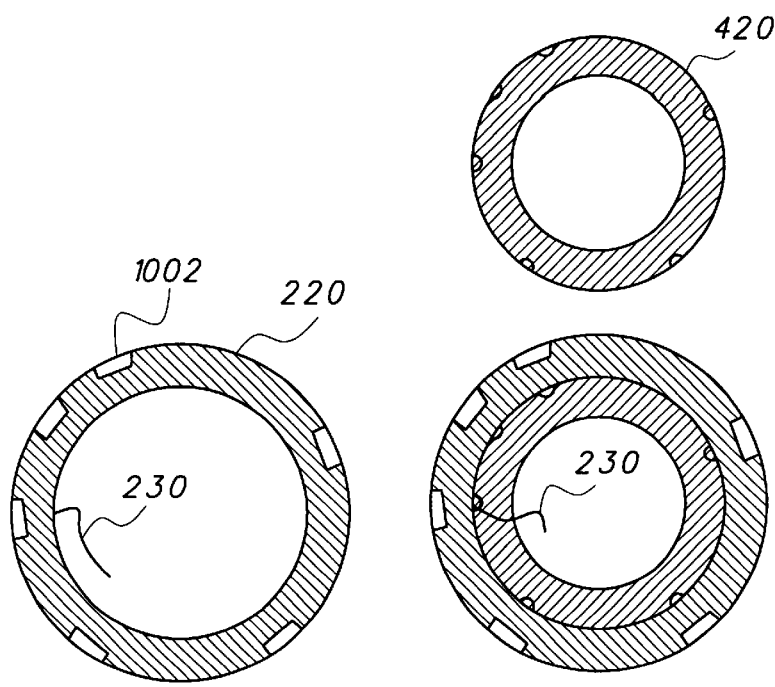
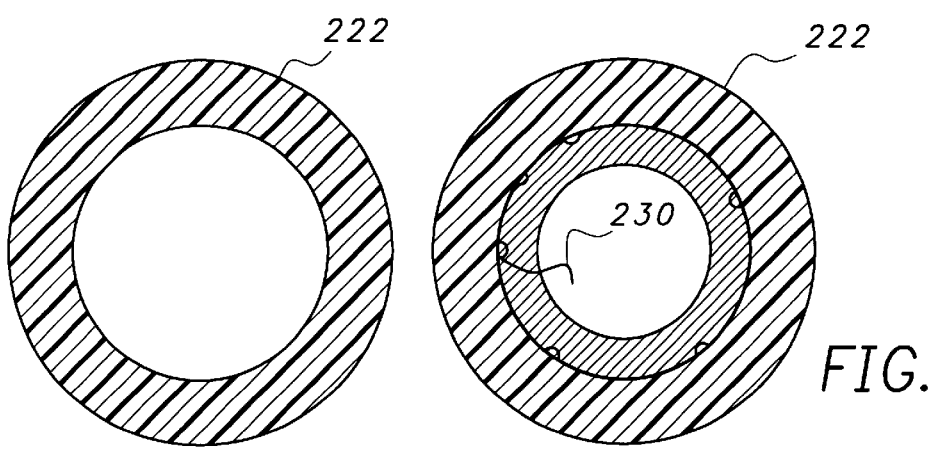
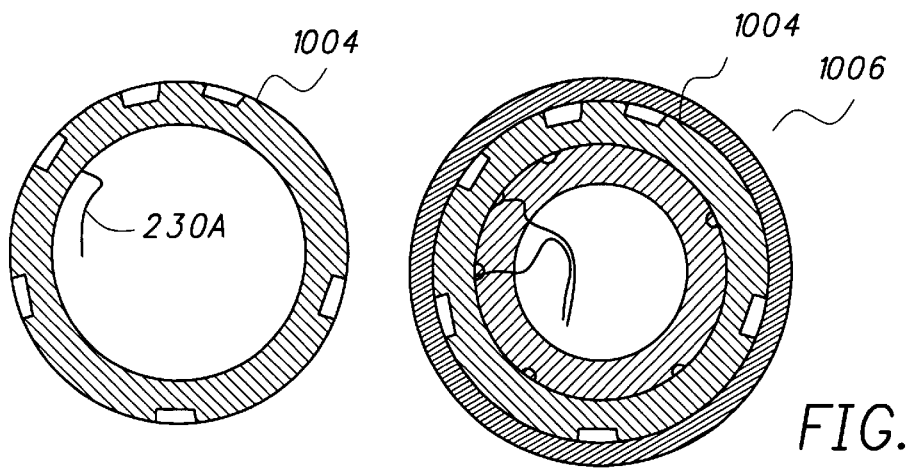
FIG. 10A
FIG. 10B
FIG. 10C
FIG. 10D

SLIP RING POSITION ENCODER

BACKGROUND OF THE INVENTION

1. Field of the Invention

The present invention relates generally to angular position measurement devices, and in particular to a low cost slip ring encoder for determining the angular position of a satellite solar wing drive shaft.

2. Description of the Related Art

Commercial and military satellites generate electricity while in-orbit to operate satellite subsystems. Typically, this power is provided, at least in part, by solar arrays, also known as solar wings. On-orbit operation of such satellites typically require precision angular orientation of the solar wings to maximize exposure to solar energy, to minimize orbital perturbations from solar wind, and to minimize the effects of thruster impingement on the solar arrays.

In current satellite designs, solar wing position information is provided by potentiometers used in conjunction with the satellite solar wing drive (SWD). Such potentiometers are usually mounted to the solar wing shaft, and provide a resistance that varies according to the shaft position.

Unfortunately, while the foregoing potentiometers provide continuous accurate position feedback information, they are prone to on-orbit failures. Other position feedback devices, such as resolvers or optical encoders are typically more reliable, but like the potentiometers, these devices add unnecessary complexity, weight and cost to the spacecraft.

There is therefore a need for a reliable, low cost, simple device and method for measuring the angular position of a solar wing. The present invention satisfies that need.

SUMMARY OF THE INVENTION

To address the requirements described above, the present invention discloses a method, apparatus, and an article of manufacture for determining the angular position of a shaft. The apparatus comprises a circumferentially alternating series of conducting and substantially non-conducting segments on an exterior surface of the shaft, and at least one contact surface in communication with the surface of the shaft, the contact surface sized to communicate with no more than one conducting segment at a time. Several embodiments of the foregoing apparatus are possible. For example, in one embodiment, two electrically isolated or redundant contact surfaces are used to communicate with different surfaces of the shaft to assure that at least one of the contact surfaces is in electrical communication with at least one of the conducting segments at any shaft angular position. In another embodiment of the invention, the apparatus comprises a second circumferentially alternating series of conducting and substantially non-conducting segments on the exterior surface of the shaft, and a second contact surface in communication with the surface of the shaft. The first and second series of conducting and non-conducting segments can be arranged to provide additional angular resolution of the encoder.

Another embodiment of the present invention is described by a method of determining the angular position of a shaft by sensing a conductivity of an exterior surface of the shaft having an alternating series of conducting and substantially non-conductive surfaces, and determining the shaft angular position using the sensed conductivity of the exterior surface of the shaft. In one embodiment of the invention, the foregoing conductivity is used to supply datum information, and the precise angular position of the shaft is determined from the datum and from a number of stepper motor step commands supplied to rotate the shaft in operation. The present invention can also be used in an embodiment in which the angular position of the shaft is determined solely from the number of stepper motor commands provided to rotate the shaft. In this embodiment, sensed conductivity is periodically used to confirm the angular position determined from stepper motor commands.

The foregoing provides information regarding the shaft position with greater reliability, less cost, lower weight, and within a smaller physical envelope than previous designs.

BRIEF DESCRIPTION OF THE DRAWINGS

Referring now to the drawings in which like reference numbers represent corresponding parts throughout:

FIGS. 10A–10F are diagrams showing one method of manufacturing the slip ring encoder;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
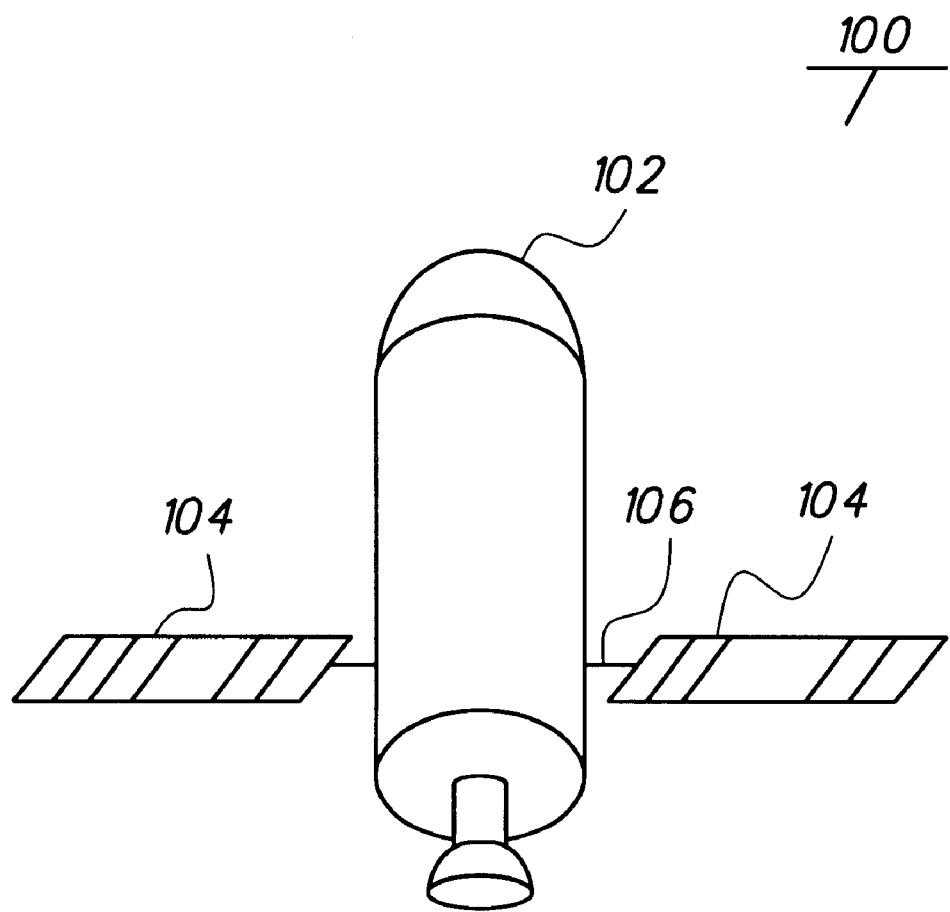
FIG. 1 is a diagram showing a typical satellite using solar wings.

FIG. 1 is a diagram depicting a typical satellite 100. The satellite 100 comprises a satellite body 102 and one or more solar wings 104 attached thereto by a shaft 106. The solar wings collect solar energy for the satellite 100, convert the solar energy to electrical energy, and provide the electrical energy to the satellite power control and distribution system. To maximize energy collection, the solar wings 104 are typically controllingly oriented so that they directly face the Sun. This is typically accomplished by rotating the shaft 106, as well as any other mechanisms provided for this purpose. Solar wings 104 may also be rotated to minimize or take advantage of radiation pressure or gravity gradient effects on the satellite, to minimize the propellant and/or energy used to comply with on-orbit station keeping requirements. To accomplish the foregoing, the solar wing shafts 106 are rotated by a SWD assembly, which is typically located in the satellite body 102.

Figure 2:
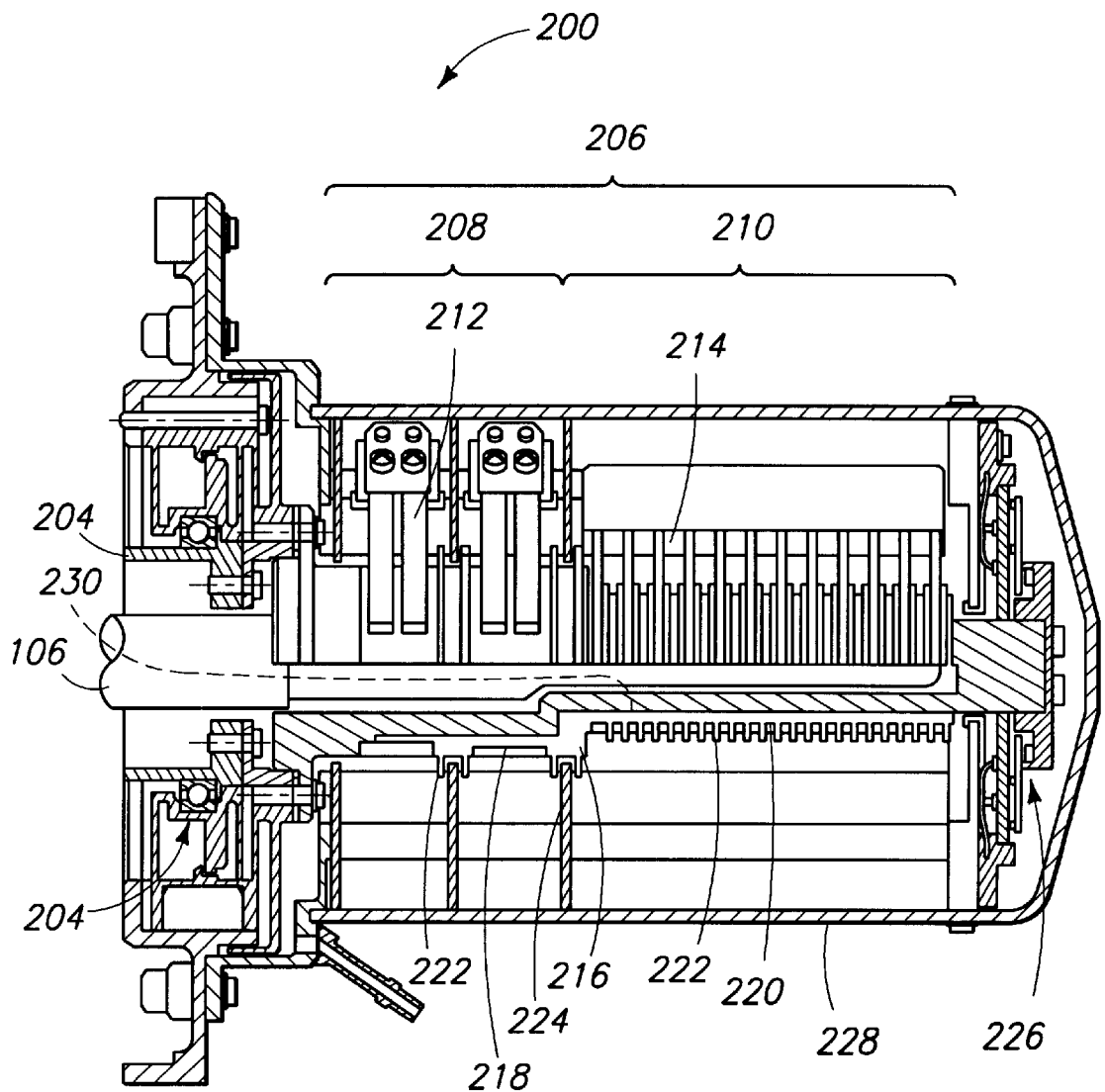
FIG. 2 is a drawing showing the electrical contact ring assembly (ECRA) portion of a typical solar wing drive.

FIG. 2 is a diagram the ECRA 206 portion of a SWD 200. The SWD 200 rotatably supports the shaft 106 within the SWD housing 228 with a plurality of main bearings 204, arranged about the periphery of the shaft 106. The ECRA 206 includes an ECRA power section 208 and an ECRA signal section 210. The ECRA power section 208 provides an electrical path to convey electricity generated by the solar array 104 to the satellite body 102, and the ECRA signal section 210 provides one or more electrical paths to transcieve signals between the satellite 100 subsystems in the satellite body 102 and those which are rotatably mounted to the shaft 106.

In one embodiment, the shaft 106 comprises a contact assembly 216, which is comprised of an assemblage of a plurality of conductive contact rings 220 and substantially non-conductive separator disks 222. The exterior surface of the contact rings 220 are each separately electrically coupled to a wire 230 which passes through the shaft 106 and are made available to subsystems external to the satellite body 102. Brush elements, such as power brush 212 and signal brush 214, slidingly contact the exterior surface of the contact rings 220 as the shaft 106 is rotated, thereby providing continuous electrical contact with the conductive exterior surface of the contact rings 220. Separator disks 222 prevent unwanted electrical interference from adjacent contact rings 220 and act so as to urge the brush elements 212 and 214 in contact with their respective contact rings 220. Additional isolation elements 224 may be placed between separator disks 222 to further isolate adjacent rings, and to prevent debris from moving from one contact ring 220 to another. A rotary potentiometer 226 is coupled to the shaft 106 and the housing 228, and provides a resistance value that is proportional to the angular position of the shaft 106.

Figure 3:
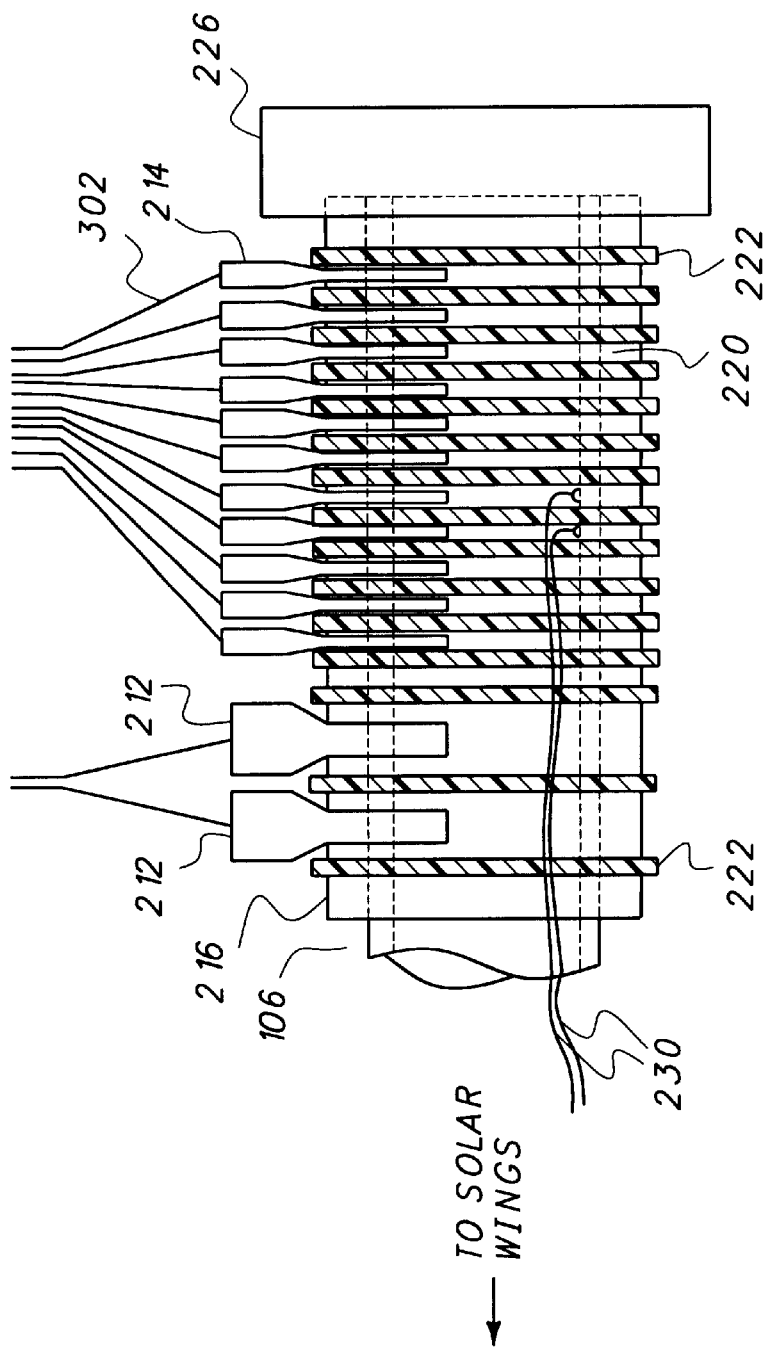
FIG. 3 is a schematic diagram showing selected ECRA elements.

FIG. 3 is a schematic diagram showing the ECRA 206 elements in additional detail. The contact assembly 216 is formed on the shaft 106 as an assembly or alternating contact rings 220 and separator disks 222. Each contact ring 220 includes a wire 230 electrically coupled to its inner diameter and passing through the interior of the shaft 106 to provide electrical signals and power to satellite 100 subsystems that rotate with the solar wings 104. Connection to the satellite body 102 is provided by the power brush element 212 and the signal brush element 214. The signals provided by the signal brush elements 214 are supplied to the satellite 100 subsystems via signal wires 302, and the power provided by the power brush elements 212 is provided to a power bus 306 for use in the spacecraft 100 subsystems as well.

Figure 4B:
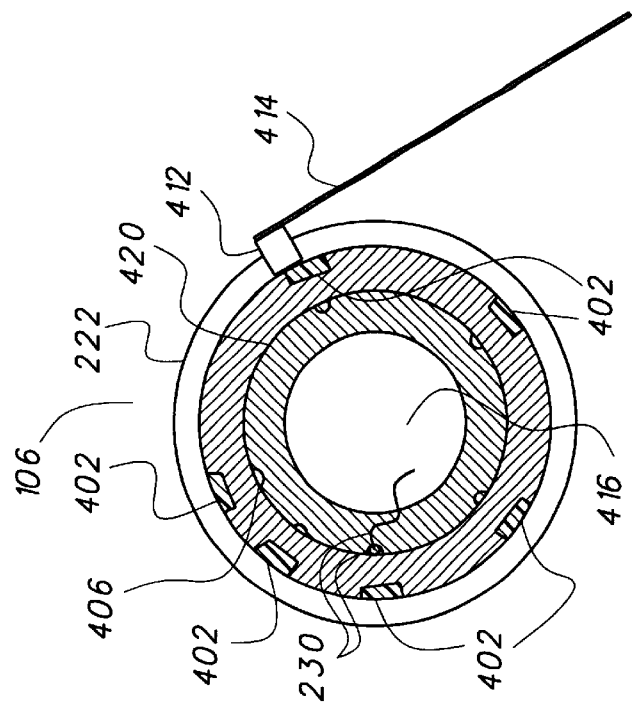
FIGS. 4A–4B are diagrams showing an embodiment of the slip ring shaft encoder of the present invention.
Figure 4A:
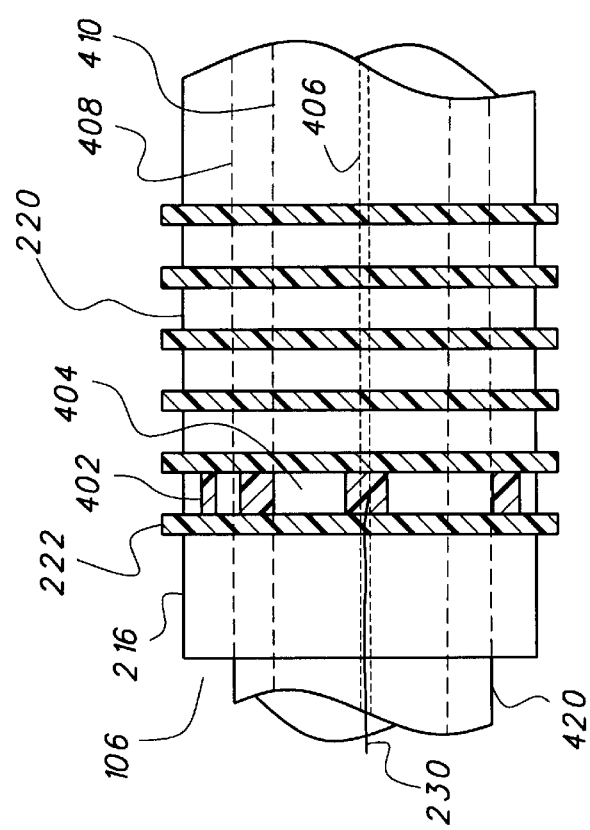
Figure 4C:
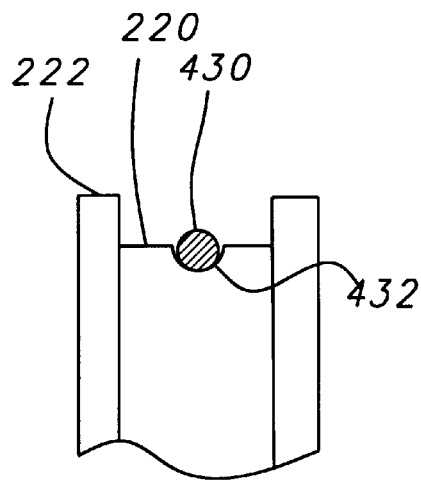
FIGS. 4C–4F are diagrams showing different brush contact embodiments.
Figure 4D:
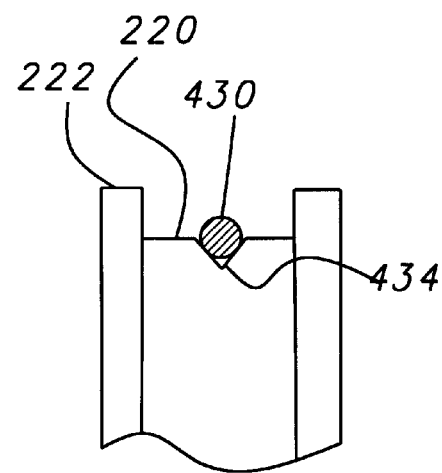
Figure 4E:
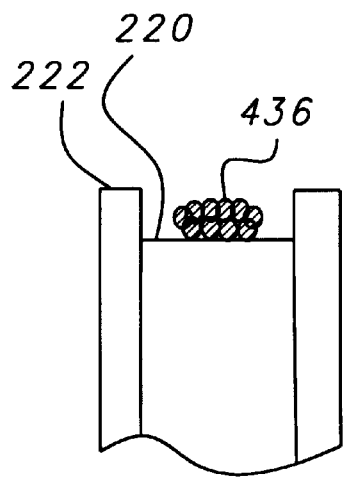

FIGS. 4A–4B are diagrams showing one embodiment of the present invention. In this embodiment, the exterior surface of the shaft 106 comprises a circumferentially alternating series of conducting segments 404 and substantially non-conducting segments 402. A contact surface 412 such as the illustrated brush block is in communication with the shaft 106 surface. In one embodiment of the invention, the contact surface 412 is urged against the shaft 106 surface via a spring arm 414. The contact surface 412, the conducting segments 404, and the non-conducting segments 402 are sized in circumferential extent so that no more than one of the conducting segments 402 is in communication with the contact surface 412.

As described above, the foregoing can be implemented by assembling the contact assembly 216 with an alternating series of contact rings 220 and separator disks 222. The contact rings 220 have an interior surface 408 diameter that is slightly larger than the exterior of the center shaft 420. The contact wires 230, which are electrically connected to the contact rings (and hence, the conducting segments 404) pass through wire grooves 406 in the outside surface of the center shaft 420.

As the shaft 106 rotates, the contact surface 412 slidingly communicates with non-conducting segments 402 and conducting segments 404. Since the location of the non-conducting segments 402 and the conducting segments 404 are known, the information derived from this communication can be used to determine the angular position of the shaft 106. In the illustrated embodiment, the circumferential extent of the contact surface 412 is smaller than the circumferential extent of the non-conducting surface, assuring that the contact surface 412 will be in contact with no more than one conducting surface at a time. Hence, there are angular positions for the shaft 106 for which the contact surface 412 is in communication with only the non-conducting surface 412.

Figure 4F:
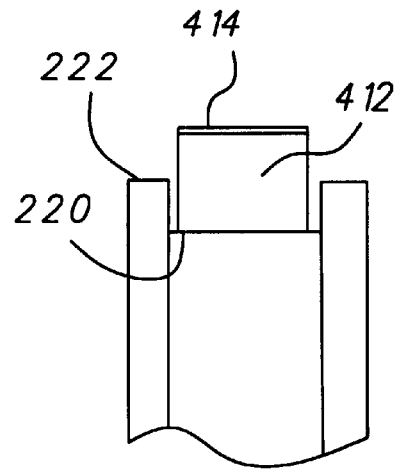

FIGS. 4C–4F are diagrams illustrating additional embodiments of the present invention. In an alternative embodiment illustrated in FIG. 4C, the contact surface 412 and spring arm 414 comprises a wire 430 of sufficient thickness and stiffness to contact the exterior surface of the contact rings 220. To increase electrical contact between the wire and the contact rings 220, the exterior surface of the contact rings 220 may also comprise an inscribed groove 432 of substantially sized and shaped to accept the wire 430. In the alternative embodiment in FIG. 4D, the inscribed groove is V-shaped in cross section. In the alternative embodiment presented in FIG. 4E, the contact surface 412 and spring arm 414 functions are performed by a plurality of small conductive wires 436 forming a brush. FIG. 4F depicts the composite brush block structure shown in FIG. 4B.

Depending on the application, different patterns of conducting segments 404 and non-conducting segments 402 can be used. For example, in the illustration of FIG. 4B, the non-conducting segments 402 are all of the same circumferential extent. That is, each of the non-conducting segments are of the same rotational length. Alternatively, the foregoing invention may be practiced in an embodiment in which the conducting segments are of equal length. It is also possible to define patterns of conducting segments 404 and non-conducting segments 402 with a view to increasing angular measurement resolution at angular positions where increased accuracy is desired, and fewer conducting segments 404 and non-conducting segments 402 where reduced precision is acceptable.

Figure 5B:
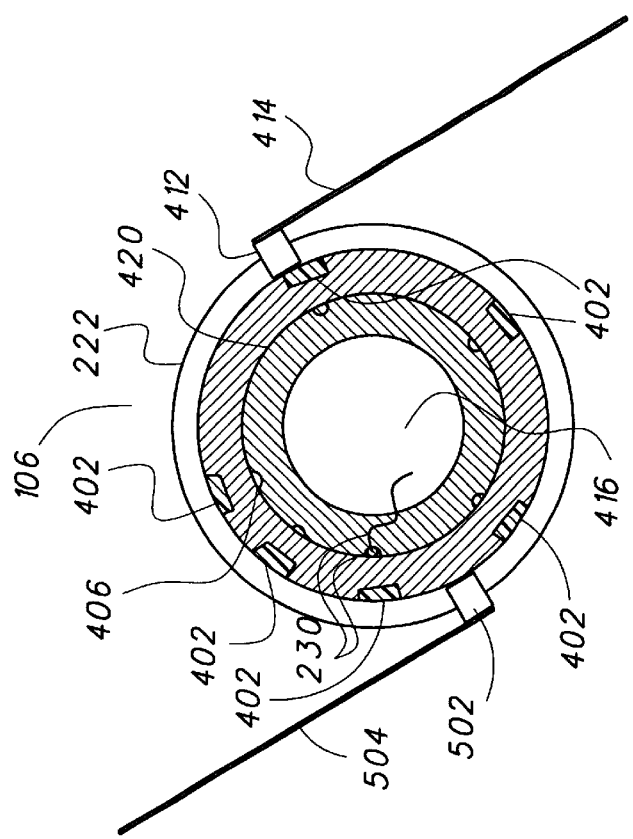
FIGS. 5A–5B are diagrams showing an embodiment of the slip ring shaft encoder using dual contact devices.
Figure 5A:
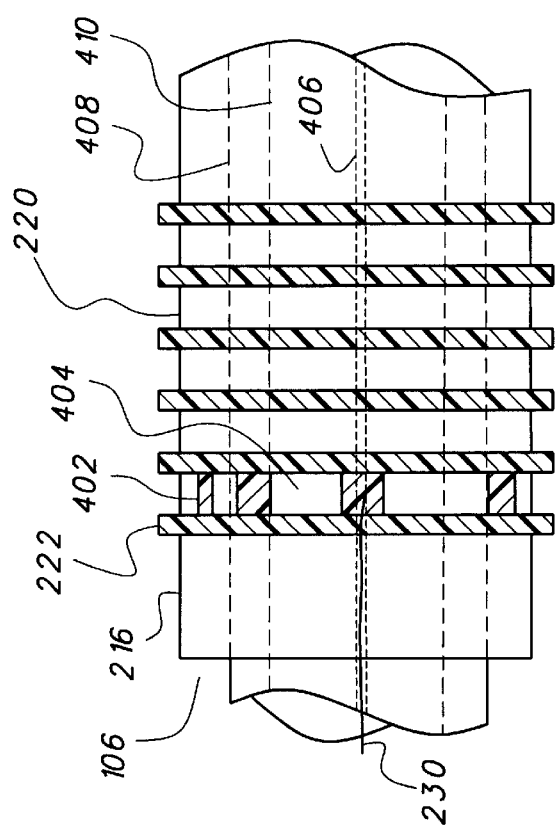

FIGS. 5A–5B present an alternative embodiment of the present invention using two contact surfaces. In this embodiment, the contact surface 412 is augmented with a second contact surface 502 which is held in sliding contact with the surface of the contact ring 220 by a second spring member 504. This additional contact surface permits electrical contact to be made with one of the conducting surfaces 404 at all times. This assures that the signal on the contact ring 220 will always be read and allows the slip ring encoder to be used without dedicating a contact ring 220 for purposes of shaft 106 rotational position measurement. This embodiment ordinarily requires additional components or circuitry to determine which of the contact surfaces 412, 502 are in contact with a conducting segment 404. This can be accomplished with a current or voltage-sensing device. This embodiment also permits increased measurement resolution. By properly phasing the pattern of conducting 404 and non-conducting segments 402 with symmetric and non-symmetric patterns.

Figure 6B:
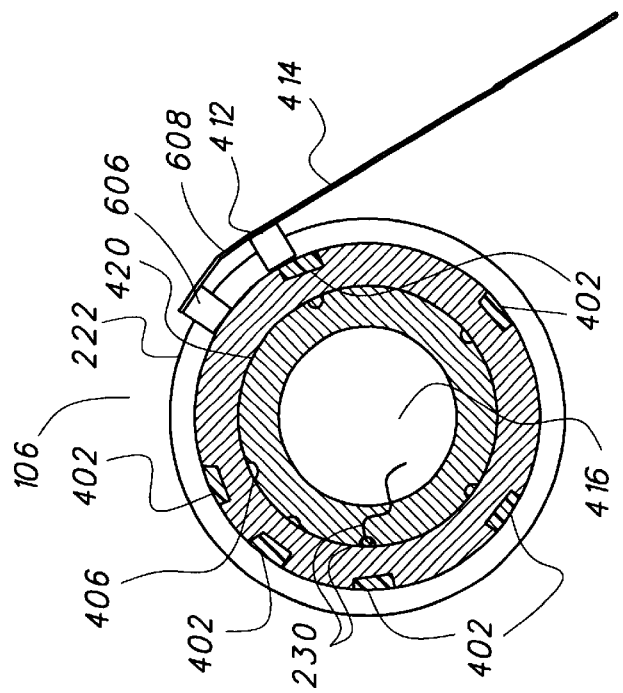
FIG. 6B is a diagram showing an embodiment of the slip ring shaft encoder using dual brushes.
Figure 6A:
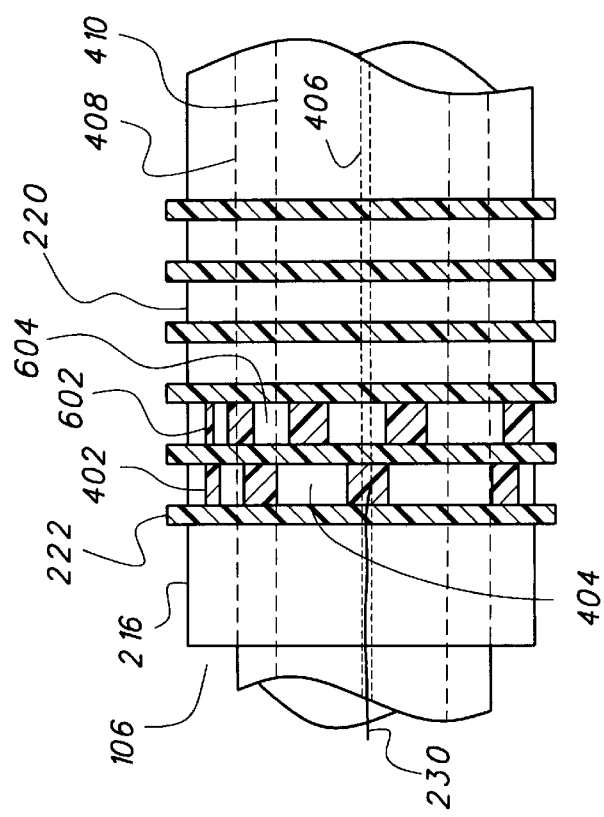
FIG. 6A is a diagram showing an embodiment of the slip ring shaft encoder using dual conducting and non-conducting segments.

FIG. 6A is a diagram showing an additional alternative embodiment of the invention in which two slip ring encoders are used. In this embodiment, a second circumferentially alternating series of non-conducting 602 and conducting 604 segments are presented on a second contact ring. The pattern of the second series of alternating non non-conducting segments 602 and conducting segments 604 can be selected to provide additional precision. Hence, a greater number of non-conducting 602 and conducting 604 segments can be used. The size of the non-conducting segments 602 and the contact surface used to read the segments in the second slip ring encoder can be adjusted as required. Additional contact rings with conducting segments 404 and non-conducting segments 402 can be utilized for greater precision, if desired.

FIG. 6B is a diagram showing an additional alternative embodiment of a multi-contact system. In this embodiment, a second contact surface 606 is disposed in a fixed relationship with the first contact surface 412 via a spring arm extension 608. This embodiment can be used to increase resolution, using the techniques described above with respect to FIG. 5B and FIG. 6A.

Figure 6C:
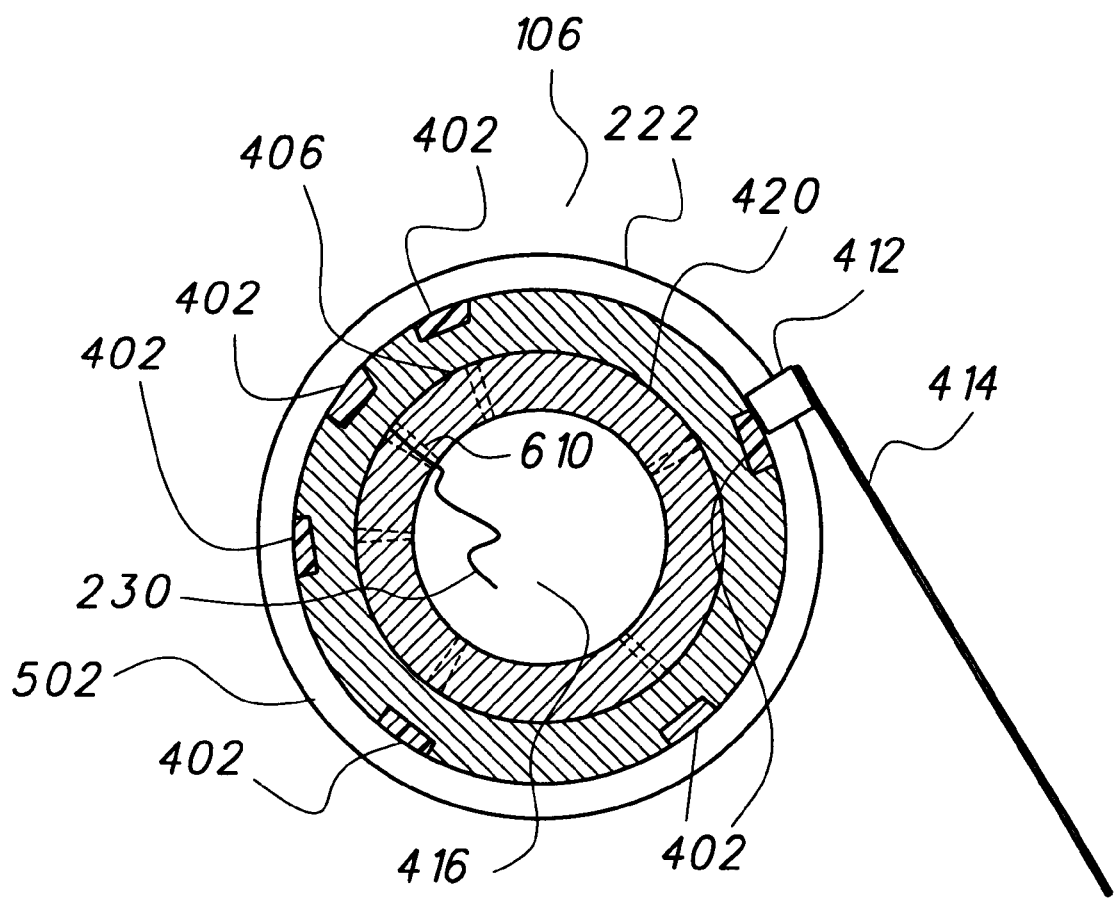
FIG. 6C is a diagram showing an embodiment of the slip ring shaft encoder wherein the center shaft comprises slots therethrough to provide a passageway for the contact wires.

FIG. 6C is a diagram depicting an alternative embodiment of the present invention. In this embodiment, the contact wires 230 are routed to the center shaft interior section 416 via a plurality apertures 610 such as slots or holes in the center shaft 420, axially along interior section 416 which is thereafter potted with epoxy material.

Figure 7:
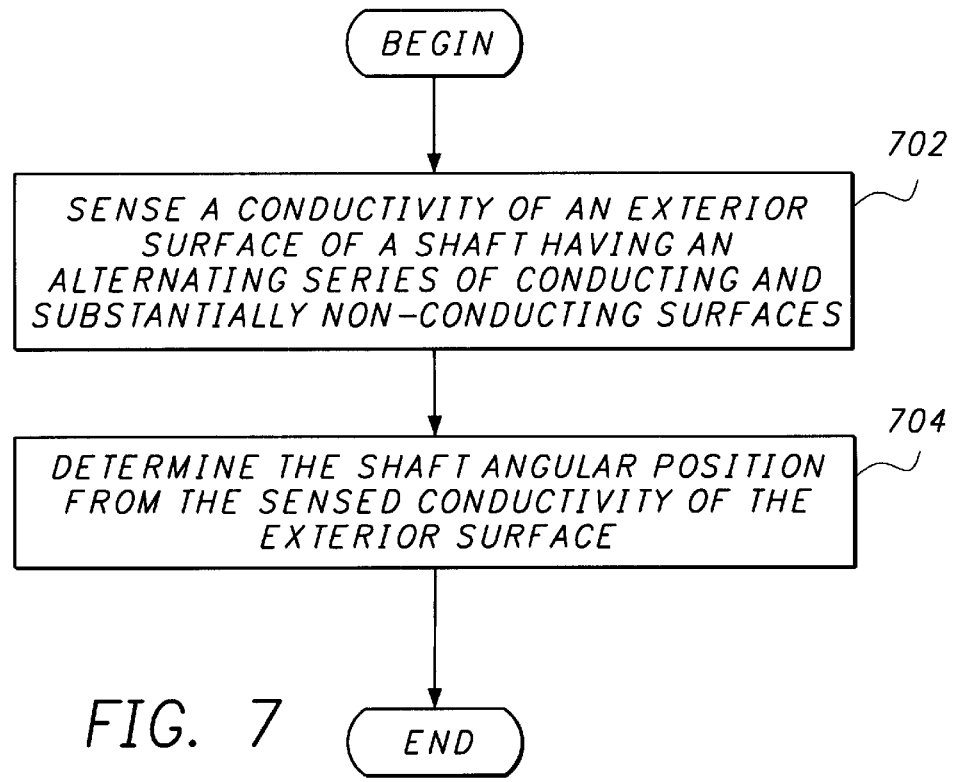
FIG. 7 is a flow chart showing exemplary process steps used to practice one embodiment of the present invention.

FIG. 7 is a flow chart presenting exemplary process steps used to practice one embodiment of the present invention. First, as illustrated in block 702, a conductivity of an exterior surface of the shaft 106 is sensed. Then, that information is used to determine the shaft angular position, as shown in block 704.

Figure 8:
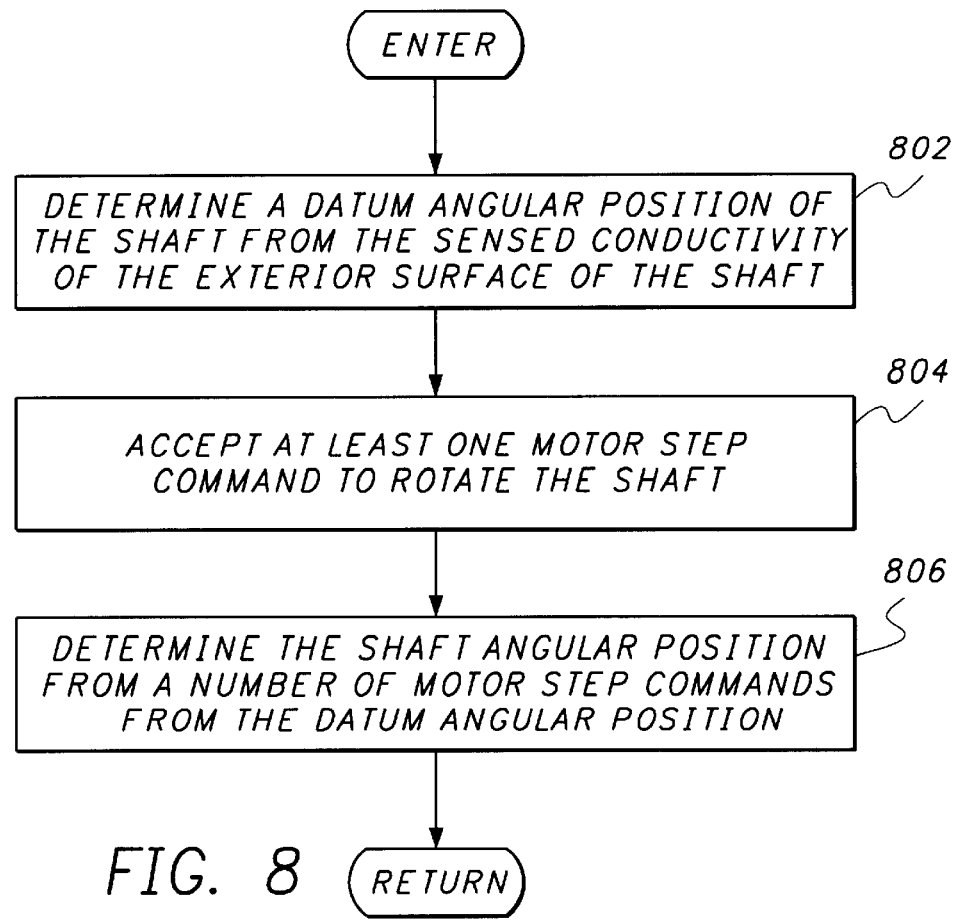
FIG. 8 is a flow chart showing exemplary process steps used to practice an embodiment of the present invention in which motor step commands are used to determine angular shaft positions.

FIG. 8 is a flow chart illustrating an embodiment of the invention wherein the conductivity of the shaft 106 is used in conjunction with other information, such as the number of commanded motor steps, to determine the position of the shaft 106. This embodiment is useful wherein the motor or other device rotating the shaft 106 provides rotation in substantially predictable amounts. For example, if a stepper motor is used to rotate the shaft 106, the amount of rotation obtained from each stepper motor command is reasonably constant and repeatable.

Block 802 illustrates determining a datum angular position of the shaft 106 from the sensed conductivity of the exterior surface of the shaft 106. Stepper motor commands are then accepted to rotate the shaft 106. Since the angular displacement of the shaft 106 is a function of the number step commands provided to the stepper motor, the shaft angular position can be determined from the number of motor step commands from the datum angular position. This is illustrated in blocks 804 and 806. Using this method, only a single datum (and hence, a single non-conducting segment 402) is required in most circumstances. However, if the relationship between motor step commands and actual shaft 106 angular displacement is less predictable or repeatable, additional datums can be provided which can be used to account for such variations.

Figure 9:
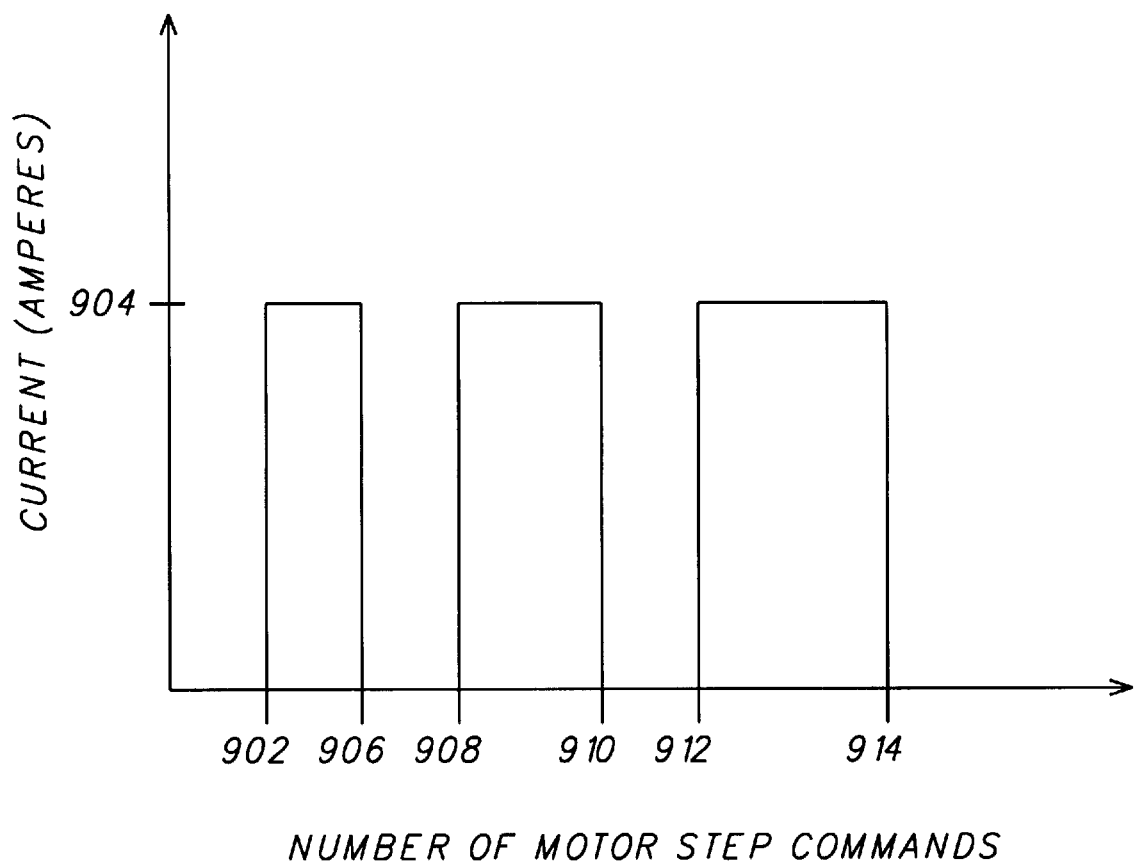
FIG. 9 is a diagram showing a typical relationship between current from the slip ring encoder and motor step commands.

FIG. 9 is a plot showing the relationship between the number of motor step commands and the amount of current (representing a signal) that is measured by the contact surface 412. When the contact surface 412 is in contact with the substantially non-conductive surfaces 402, the measured signal is zero. As the motor is provided with step commands, the number of motor step commands roughly corresponds to the angle of the shaft 106. As the motor is provided with additional step commands, the contact surface 412 makes contact with the conductive surfaces 404, and the signal rises to level 904. When this happens, a datum is established providing an accurate measure of the shaft 106 angular position. The shaft 106 angular position is determined by counting the number of additional motor step commands from this datum point, until a new datum can be established. As more motor step commands are provided, the contact surface 412 loses contact with the conducting segments 404, and a new datum, corresponding to location 906 is established. From this point, additional motor step commands can be provided, and the angular position of the shaft 106 determined by counting the number of motor step commands from the datums provided by points 908–914. In addition, the width of the segments providing current can be used to identify the angular position of the shaft 106 from among the datums 902–914.

Figure 10E:
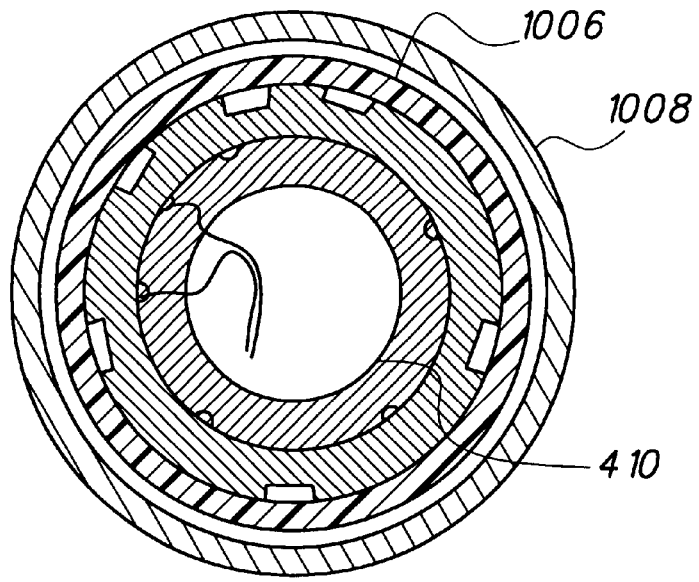
Figure 10F:
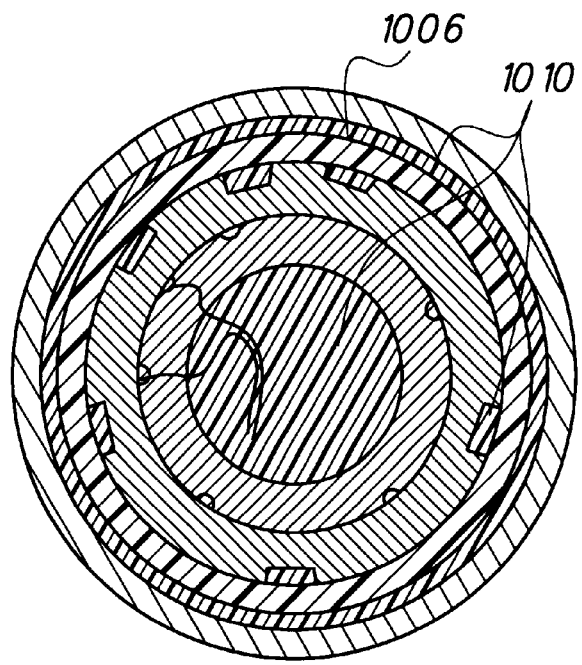

FIGS. 10A–10F are diagrams illustrating one method of assembling the shaft encoder 106 with a contact assembly 216 comprising an alternating series of contact rings 220 and separator disks 222. First, notches 1002 are prepared in a center ring 220, and a solid silver center ring 220 (which has an inside diameter of less than the outside diameter of the center shaft) is placed on a center shaft 420. A contact wire 230 soldered to the interior surface of the contact ring 220 is placed in the wire groove 406 running axially in the center shaft 420 to allow the wire to run axially along the center shaft 420 and exit from the center shaft 420 as shown in FIG. 10B. Alternatively, the contact wire can be passed through an aperture 610 such as a slot or hole in the center shaft 420 to the center shaft interior section 416 to create the embodiment depicted in FIG. 6C. Then, a separator disk 222 is placed on the center shaft on top of the center ring 220, providing the result shown in FIG. 10C. If additional center rings 1004 are desired, they are also placed on the center shaft 420 as shown, with the wires extending from the center rings passing through the wire groove 406. This results in the embodiment shown in FIG. 10D. This process is continued until the requisite number of center rings 220 are placed on the center shaft 420, thus assembling a shaft encoder assembly 1006. Then, the shaft encoder assembly 1006 is placed in a cast 1008, as shown in FIG. 10E. Substantially non-conductive dielectric material 1010 such as a plastic is then injected into the center of the center shaft 420 (the volume of the center shaft interior section 416 circumscribed by center shaft interior surface 410), and at the periphery of the shaft encoder assembly 1006. The substantially non-conductive material fills the center of the center shaft 420, and the notches 1002, thus forming the substantially non-conductive segments. After the non-conductive material has cooled, the shaft encoder assembly 1006 is removed and the contact surfaces of the contact rings 220 are machined to remove excess dielectric material and to expose the conductive segments 404.

In another embodiment, the present invention can be manufactured by preparing center rings 220 with notches, and placing those center rings in a cast to form the substantially non-conductive segments 402. Thus, the non-conductive segments may be formed before the shaft encoder assembly 1006 casting process.

Figure 11A:
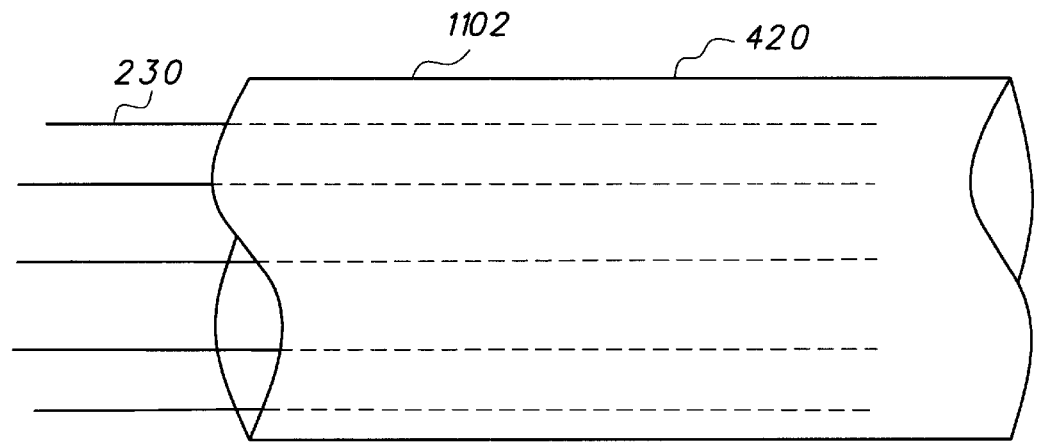
FIGS. 11A–11F are diagrams showing another method of manufacturing the slip ring encoder.
Figure 11B:
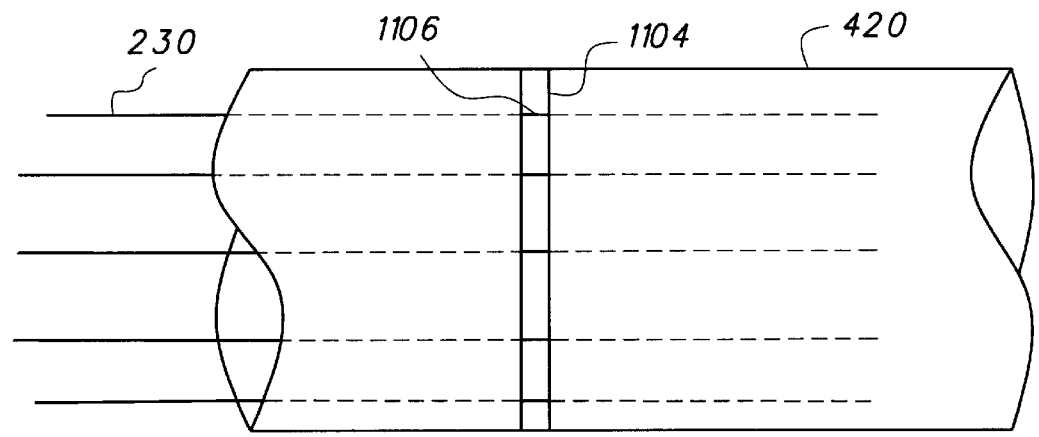
Figure 11C:
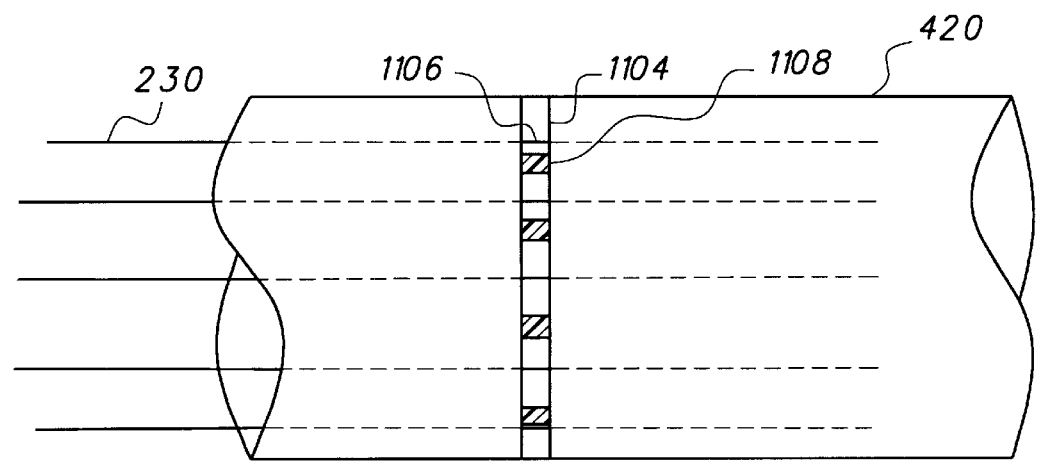
Figure 11D:
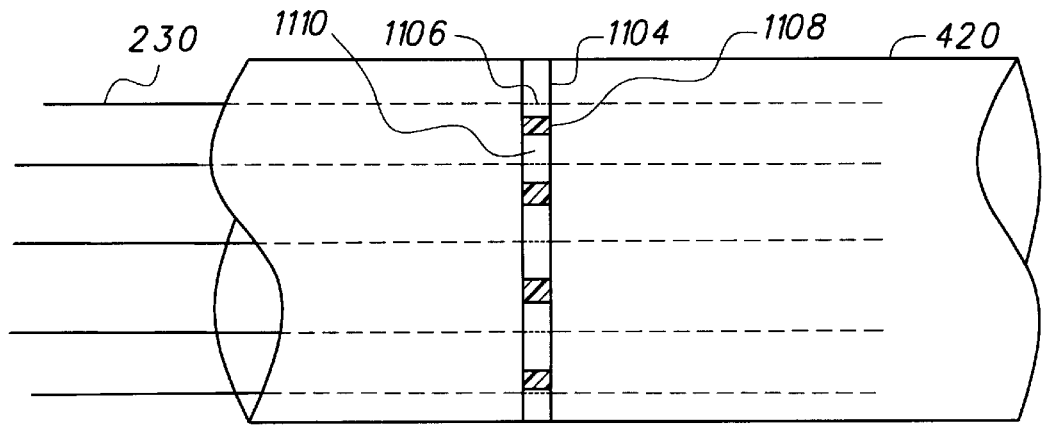
Figure 11E:
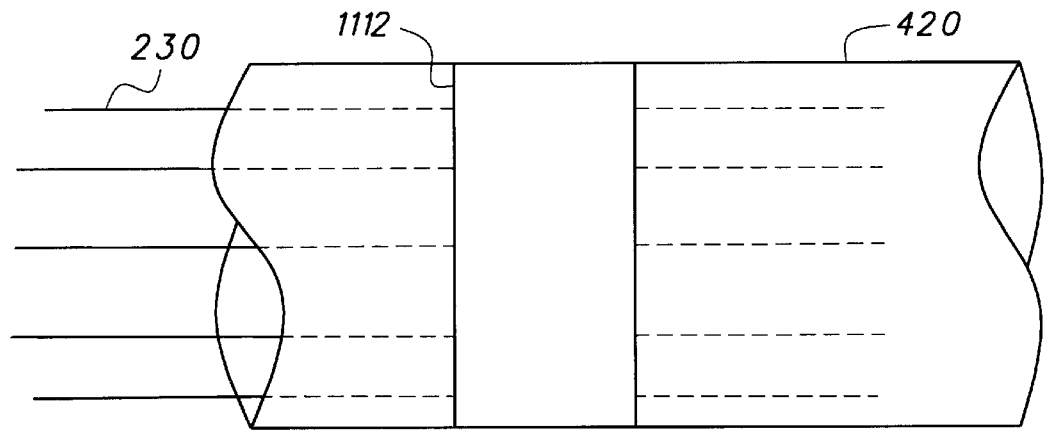
Figure 11F:
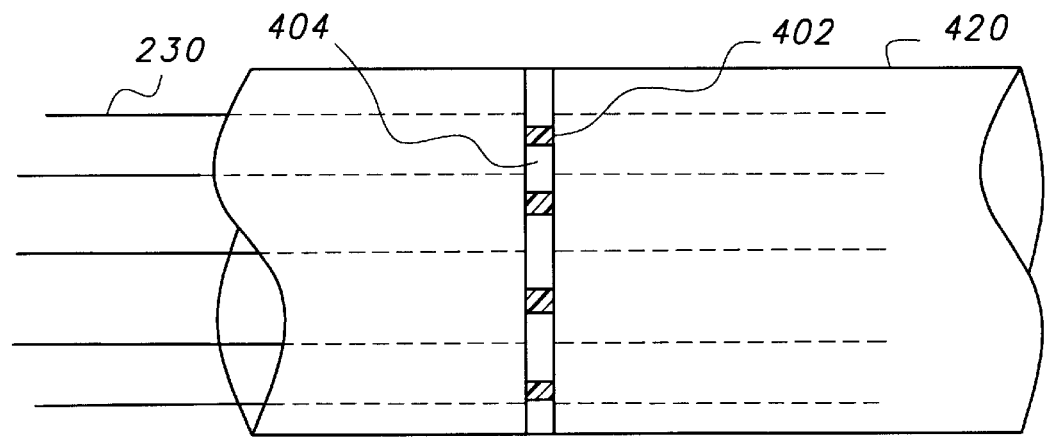

FIGS. 11A–11C depict another embodiment of the present invention showing a different manufacturing technique. Here a plastic center shaft 420 is cast containing contact wires near, but below the surface of the plastic center shaft 420, as shown in FIG. 11A. Then, the plastic is selectively machined in a machining area 1104 to reveal one or more contact wires inside 1106, as shown in FIG. 11B. To form the non-contacting segments 402 for this type of assembly, the plastic shaft 402 is masked with a non-contact pattern 1108, as shown in FIG. 11C. A silver ring is then electro-deposited onto the plastic center shaft 420 such that the ring is in electrical contact with one of the wires, as shown in FIG. 11D, thus forming conducting portions 1110 and non-conducting portions 1108. After plating, plastic material 1112 is cast over both the plated and bare portions of the center shaft 402, as shown in FIG. 11E. The center shaft is then machined to reveal the plated areas (which are now the conducting segments 404), the non-plated areas (which are now the substantially non-conducting segments 402) and to create accurate cylindrical contact surfaces.

Figure 12A:
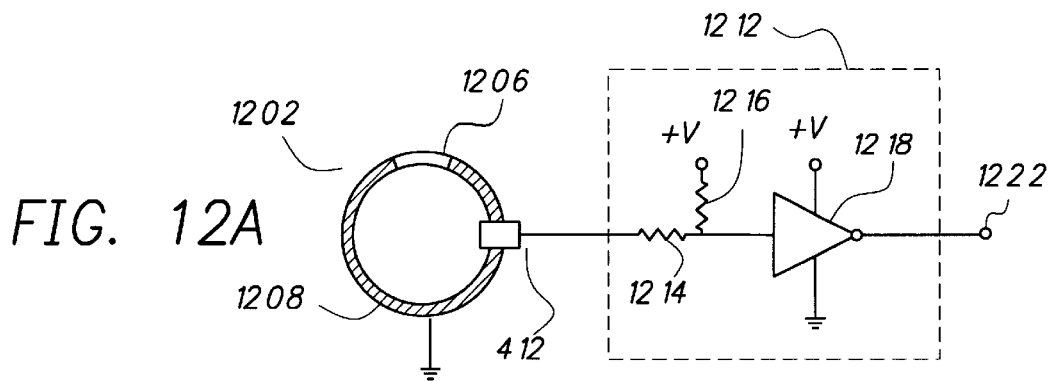
FIGS. 12A–12D are diagrams showing another embodiment of the slip ring encoder.
Figure 12B:
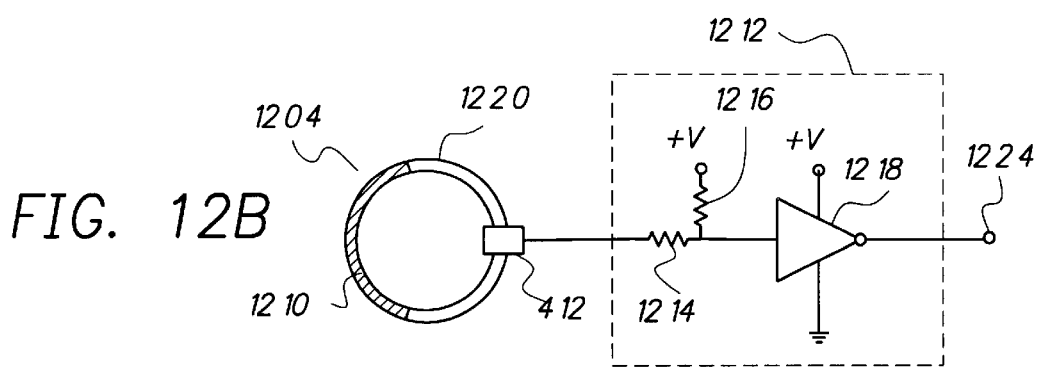

FIGS. 12A–12D depict embodiments of the present invention that provide design elements for returning to a known "home" position. FIG. 12A depicts a position ring 1202 and a FIG. 12B depicts a direction ring 1204. The position ring 1202 has contact material 1208 in all but a narrow patch 1206 of the perimeter, which corresponds to the "home" position. The position ring 1202 is in the "home" position when the contact surface 412 completely in the narrow patch 1206 and does not contact the contact material 1208. The direction ring 1204 has contact material 1210 on less than one 180 degrees of its perimeter, and non-contact material 1220 on the remainder of the perimeter. When its associated contact surface 412 is not contacting the contact material 1210, the shaft is commanded to the home position via clockwise motion. Similarly, when the associated contact surface 412 is contacting the contact material 1210, counterclockwise motion is used to bring the shaft to the home position. Using this technique, there is no shaft rotational position in which there is contact between the contact surface 412 and the contact material 1208 of the position ring 1202 as well as contact between the contact material 1210 of the direction ring 1204. The signals from the position ring 1202 and the direction ring 1204 are read by logical circuitry 1212. Logical circuitry 1212 comprises a resistive voltage divider having a first resistor 1214 and a second resistor 1216, and a digital gate or buffer 1218 coupled thereto. The position ring logical output 1222 and the direction ring logical output are combined as described in Table 1 below to determine the shaft motion command.

TABLE I

| Command | Stop | N/A | CW | CCW |
| --- | --- | --- | --- | --- |
| Position Ring Logical Output | 0 | 0 | 1 | 1 |
| Direction Ring Logical Output | 0 | 1 | 0 | 1 |

Figure 12C:
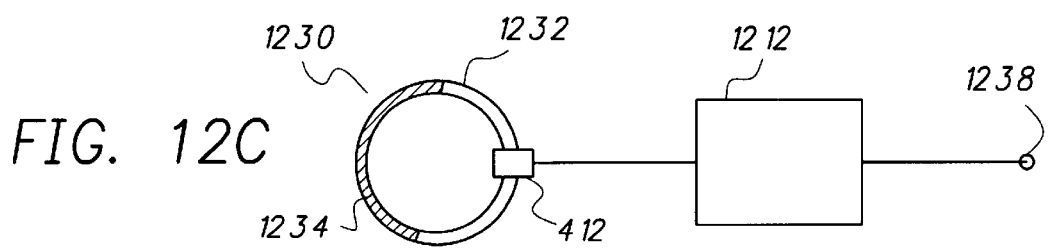
Figure 12D:
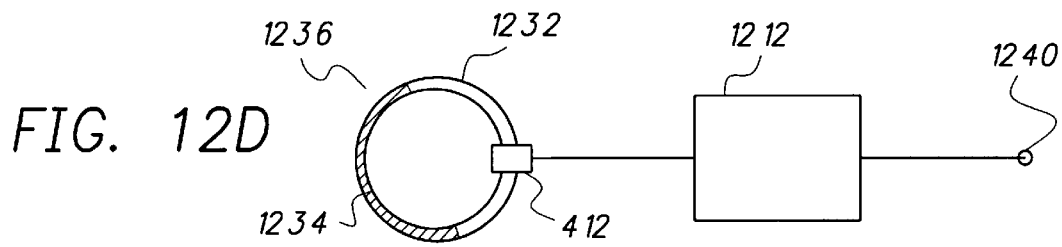

FIGS. 12C–12D are diagrams depicting another embodiment using a second position ring 1230 and a second direction ring 1236. The second position ring 1230 shown in FIG. 12C has contact material 1234 on about 180 degrees of the perimeter, including the home position 1242. The direction ring 1236 shown in FIG. 12D has contact material 1234 on less than 180 degrees of the perimeter. The home position can be derived as shown in Table II below.

| Command | CW or CCW | CW | CCW | Stop |
| --- | --- | --- | --- | --- |
| Position Ring Logical Output 1238 | 0 | 0 | 1 | 1 |
| Direction Ring Logical Output 1240 | 0 | 1 | 0 | 1 |

Another possible embodiment of the present invention requires only one contact ring, configured as the direction ring 1204 of FIG. 12B. In this embodiment, if the initial state indicates a contacting state (that the contact surface 412 is contacting the contact material 1210) counter clockwise ring motion is commanded, and terminated upon reaching a non-contacting state. Similarly, if the initial condition is non-contacting, clockwise contact ring motion is commanded until a contacting state is reached.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. In summary, the present invention discloses a method, apparatus, and an article of manufacture for determining the angular position of a shaft. The apparatus comprises a circumferentially alternating series of conducting and substantially non-conducting segments on an exterior surface of the shaft, and at least one contact surface in communication with the surface of the shaft, the contact surface sized to communicate with no more than one conducting segment at a time. Several embodiments of the foregoing apparatus are possible. For example, in one embodiment, two contact surfaces are used to communicate with different surfaces of the shaft to assure that at least one of the contact surfaces is in electrical communication with at least one of the conducting segments at any shaft angular position. In another embodiment of the invention, the apparatus comprises a second circumferentially alternating series of conducting and substantially non-conducting segments on the exterior surface of the shaft, and a second contact surface in communication with the surface of the shaft. The first and second series of conducting and non-conducting segments can be arranged to provide additional angular resolution of the encoder.

Another embodiment of the present invention is described by a method of determining the angular position of a shaft by sensing a conductivity of an exterior surface of the shaft having an alternating series of conducting and substantially non-conductive surfaces, and determining the shaft angular position using the sensed conductivity of the exterior surface of the shaft. In one embodiment of the invention, the foregoing conductivity is used to supply datum information, and the precise angular position of the shaft is determined from the datum and from a number of stepper motor step commands supplied to rotate the shaft in operation. The present invention can also be used in an embodiment in which the angular position of the shaft is determined solely from the number of stepper motor commands provided to rotate the shaft. In this embodiment, sensed conductivity is periodically used to confirm the angular position determined from stepper motor commands is confirmed is correct. This provides information regarding the shaft position with greater reliability, less cost, lower weight, and within a smaller physical envelope than previous designs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. For example, while the foregoing has been described with the use of a shaft 106 with contact rings 220 and separator disks 222, the present invention can be practiced with a one piece shaft 106 having the conducting 404 and non-conducting 402 segments disposed on its exterior surface. Similarly, the foregoing invention may be practiced with a "pancake" design in which the contact rings 220 and contact surfaces are configured radially instead of axially (for example, as shown in FIGS. 12A–12B. This design is particularly useful where space is limited or where only a few contact rings are required The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for determining an angular position of a shaft, comprising:
   a circumferentially alternating series of conducting and substantially non-conducting segments on a radial exterior surface of the shaft;
   at least one contact surface in communication with the radial surface of the shaft, the contact surface sized to communicate with no more than one conducting segment at a time; and
   an electrical path, separate from the alternating series of conducting and substantially non-conducting segments to transceive a signal between a first subsystem and a second subsystem, wherein the second subsystem is rotatably mounted on the shaft.

2. The apparatus of claim 1, wherein the shaft comprises at least one contact ring, and wherein the alternating series of conducting and substantially non-conducting segments are disposed on an exterior surface of the contact ring.

3. The apparatus of claim 1, wherein the contact ring further comprises contact wires electrically coupled to the conducting segments.

4. The apparatus of claim 1, wherein each of the non-conducting segments are described by a constant angular extent.

5. The apparatus of claim 1, wherein each of the conducting segments are described by a constant angular extent.

6. The apparatus of claim 1, comprising a second contact surface in communication with the surface of the shaft.

7. The apparatus of claim 6, wherein the second contact surface is disposed so that at least one of the contact surface and the second contact surfaces are in electrical communication with at least one of the conducting segments at any shaft angular position.

8. The apparatus of claim 1, further comprising:
   a second circumferentially alternating series of conducting and substantially non-conducting segments on a second exterior surface of the shaft;
   a second contact surface in communication with the surface of the shaft, the second contact surface sized to communicate with no more than one conducting segment at a time.

9. The apparatus of claim 8, wherein a number of conducting segments in the circumferentially alternating series of conducting and substantially non-conducting segments on the second exterior surface of the shaft differs from a number of conducting segments in the first series of conducting and substantially non-conducting segments on the first exterior surface of the shaft.

10. The apparatus of claim 1, wherein the contact surface is shorter than a circumferential extent of any of the conducting segments.

11. The apparatus of claim 1, wherein the contact surface slidingly contacts the shaft exterior surface.

12. The apparatus of claim 11, wherein the contact surface is urged against the shaft exterior surface by a spring arm.

13. The apparatus of claim 1, wherein the contact surface is a brush block.

14. The apparatus of claim 1, wherein the contact surface comprises the exterior surface of a plurality of conductive elements.

15. The apparatus of claim 1, wherein the contact surface comprises the exterior surface of a wire of substantially circular cross-section.

16. The apparatus of claim 1, wherein the conducting and substantially non-conducting segments are disposed on a circumferentially inscribed guide on the shaft.

17. A method of determining the angular position of a shaft and transceiving signals, comprising the steps of:
   sensing a conductivity of a radial exterior surface of the shaft having a circumferentially alternating series of conductive and substantially non-conductive surfaces;
   determining the shaft angular position from the sensed conductivity of the radial exterior surface; and
   providing an electrical path, separate from the alternating series of conducting and substantially non-conducting segments to transceive a signal between a first subsystem and a second subsystem, wherein the second subsystem is rotatably mounted on the shaft.

18. The method of claim 17, further comprising the steps of:
   sensing the conductivity of a second exterior surface of the shaft, having a second circumferentially alternating series of conductive and substantially non-conductive surfaces;
   determining the shaft angular position using the sensed conductivity of the exterior surface and the second exterior surface.

19. The method of claim 18, wherein:
   the method further comprises the steps of determining a datum angular position of the shaft from the sensed conductivity of the exterior surface, and accepting at least one motor step command to rotate the shaft; and
   the step of determining the shaft angular position using the sensed conductivity of the exterior surface and the second exterior surface comprises the step of determining the shaft angular position from a number of motor step commands from the datum angular position.

* * * * *